(12) United States Patent
Jomura

(10) Patent No.: US 7,246,818 B2
(45) Date of Patent: Jul. 24, 2007

(54) INFLATOR

(75) Inventor: Hiroshi Jomura, Echi-gun (JP)

(73) Assignee: Takata Corporation, Tokyo (JP)

( * ) Notice: Subject to any disclaimer, the term of this patent is extended or adjusted under 35 U.S.C. 154(b) by 73 days.

(21) Appl. No.: 11/115,231

(22) Filed: Apr. 27, 2005

(65) Prior Publication Data

US 2005/0248133 A1  Nov. 10, 2005

Related U.S. Application Data

(60) Provisional application No. 60/567,653, filed on May 4, 2004.

(51) Int. Cl.
*B60R 21/16* (2006.01)

(52) U.S. Cl. .................................... 280/730.2

(58) Field of Classification Search ............ 280/730.1, 280/730.2, 743.1, 736, 737
See application file for complete search history.

(56) References Cited

U.S. PATENT DOCUMENTS

| 5,226,669 | A | 7/1993 | Honda |
| 6,145,876 | A | 11/2000 | Hamilton |
| 6,176,517 | B1 | 1/2001 | Hamilton |
| 6,217,060 | B1 | 4/2001 | Mangold et al. |
| 6,296,274 | B1 | 10/2001 | Stevens et al. |
| 6,431,595 | B1 | 8/2002 | Swann et al. |
| 6,755,438 | B2 | 6/2004 | Rink et al. |
| 6,805,377 | B2 | 10/2004 | Krupp et al. |
| 6,854,764 | B2 | 2/2005 | Larsen et al. |
| 2001/0045735 | A1 | 11/2001 | Krupp et al. |
| 2002/0180193 | A1 | 12/2002 | Smith |
| 2003/0075908 | A1 | 4/2003 | Rink et al. |
| 2004/0084885 | A1 | 5/2004 | Burns et al. |
| 2005/0082803 | A1 | 4/2005 | Teramoto et al. |
| 2005/0104349 | A1 | 5/2005 | Stevens et al. |
| 2005/0116454 | A1 | 6/2005 | Stevens et al. |
| 2005/0151358 | A1 | 7/2005 | Burns et al. |
| 2005/0184494 | A1 | 8/2005 | Sakata |
| 2005/0200103 | A1 | 9/2005 | Burns et al. |
| 2005/0218638 | A1 | 10/2005 | Burns et al. |

FOREIGN PATENT DOCUMENTS

WO   WO 00/32447   6/2000

*Primary Examiner*—Faye M. Fleming
(74) *Attorney, Agent, or Firm*—Foley and Lardner LLP

(57) ABSTRACT

A protecting device for an occupant of a vehicle includes: an airbag positioned to inflate along an interior side of a vehicle; an elongated inflator including a tube extending along the interior side of the vehicle in a longitudinal direction of the vehicle; several openings in the tube positioned to allow inflation gas to enter and inflate the airbag.

16 Claims, 7 Drawing Sheets

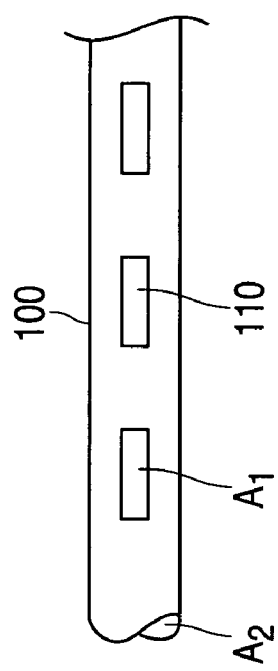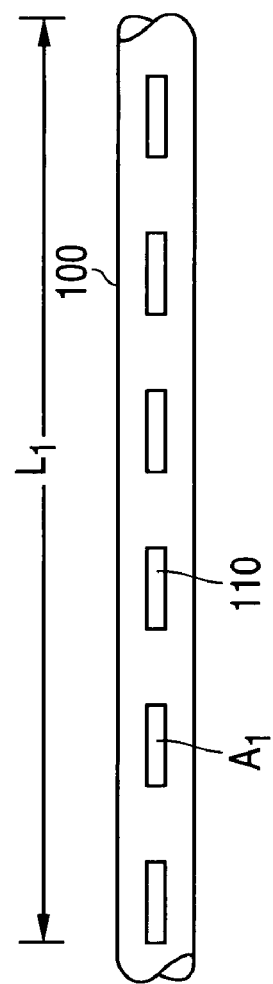

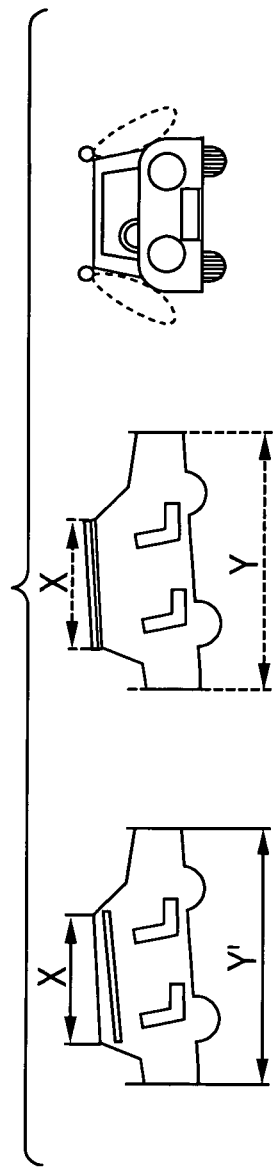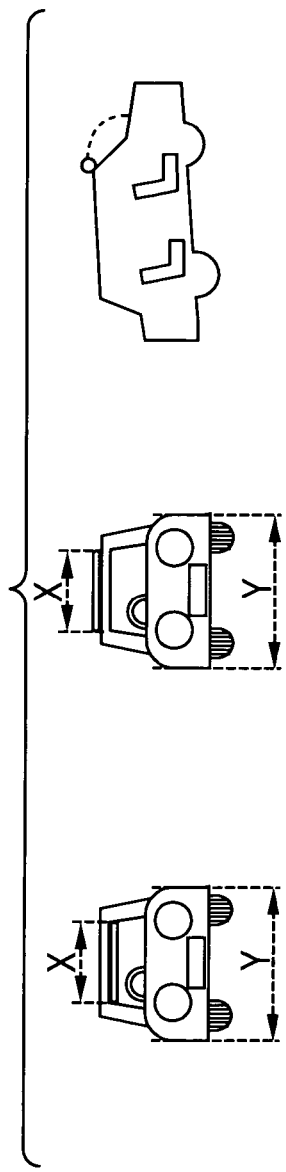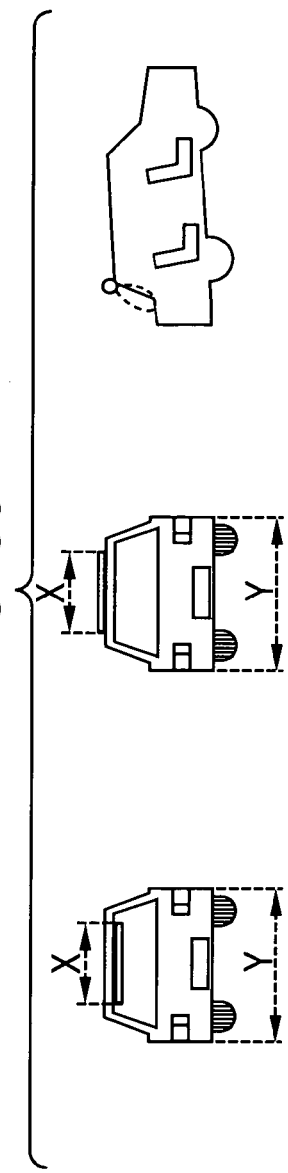

INFLATOR

CROSS REFERENCE TO RELATED APPLICATIONS

This application claims priority to and the benefit of U.S. Provisional Application No. 60/567,653, filed May 4, 2004.

BACKGROUND OF THE INVENTION

The present invention relates to an inflation device for a protective cushion for protection of a vehicle occupant. More particularly, the present invention relates to an inflation device for providing inflation gas for a cushion which is folded and disposed along an upper corner of a side of a vehicle cabin in the normal state and is inflated into a curtain shape to expand over windows of side doors and a B-pillar in the event of a side impact collision or roll-over of the vehicle.

Airbag devices mounted in vehicles such as automobiles typically include a gas generator or inflator. The inflator operates to inflate an airbag which is positioned to protect a passenger's body when the vehicle is involved in an emergency situation such as a collision.

Characteristics of an airbag are determined to a large extent by the inflator. For example, the location of the inflator may cause portions of the airbag to inflate at different rates. Typically, a portion of the airbag located closest to the inflator will inflate faster than a portion of the airbag located a location remote from the inflator. As a result, after an emergency condition is detected, certain portions of the airbag may require more time to reach an inflated state adequate to protect an occupant of the vehicle.

Furthermore, passengers sitting near the side of a vehicle are much closer to the point of collision during a side impact than they are in the case of a front impact to the vehicle. Thus, the importance of rapid and complete inflation of the airbag is heightened when the vehicle is involved in a side impact collision.

SUMMARY OF THE INVENTION

The present invention aims to solve at least one of these and other problems.

According to an embodiment of the present invention, a protecting device for an occupant of a vehicle comprises: an airbag positioned to inflate along an interior side of a vehicle; an elongated inflator including a tube extending along the interior side of the vehicle in a longitudinal direction of the vehicle; and a plurality of openings in the tube positioned to allow inflation gas to enter and inflate the airbag, wherein a number of openings per length of the inflator in meters is between about 20 and about 100.

According to another embodiment of the present invention, a protective device for an occupant of a vehicle comprises: an airbag positioned to inflate along an interior side of a vehicle; and an elongated inflator including a tube extending along the interior side of the vehicle in a longitudinal direction of the vehicle, wherein a ratio of a length of the tube to a length of the airbag is between about 0.7 and about 1.0.

According to another embodiment of the present invention, a protective device for an occupant of a vehicle comprises: an airbag positioned to inflate along an interior side of a vehicle; an elongated inflator including a tube extending along the interior side of the vehicle in a longitudinal direction of the vehicle; and a plurality of openings in the tube positioned to allow inflation gas to enter and inflate the airbag, wherein a ratio of a cross sectional area of the tube to an area of one of the openings is between about 2 and about 20.

According to another embodiment of the present invention, a protective device for an occupant of a vehicle comprises: an airbag positioned to inflate along an interior side of a vehicle; an elongated inflator including a tube extending along the interior side of the vehicle in a longitudinal direction of the vehicle; and a plurality of openings in the tube positioned to allow inflation gas to enter and inflate the airbag, wherein a ratio of an area of one of the opening to a length of the tube is between about 0.01 ($mm^2$/mm) and about 0.04 ($mm^2$/mm).

According to another embodiment of the present invention, a protective device for an occupant of a vehicle comprises: an airbag positioned to inflate along an interior side of a vehicle; and an elongated inflator including a tube extending along the interior side of the vehicle in one of a longitudinal and a lateral direction of the vehicle, wherein a ratio of a length of the inflator to a length of the vehicle in the one of a longitudinal and a lateral direction is between about 0.6 and 1.0.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 7 is a partial side view of an inflator according to an embodiment of the present invention.

FIG. 8 is a side view of a inflator according to an embodiment of the present invention.

FIGS. 9*a*-9*c* show cascade inflators connected to an automobile in various configurations.

DETAILED DESCRIPTION OF THE PREFERRED EMBODIMENTS

Hereinafter, embodiments of the present invention will be described with reference to the attached drawings.

Figure 1:
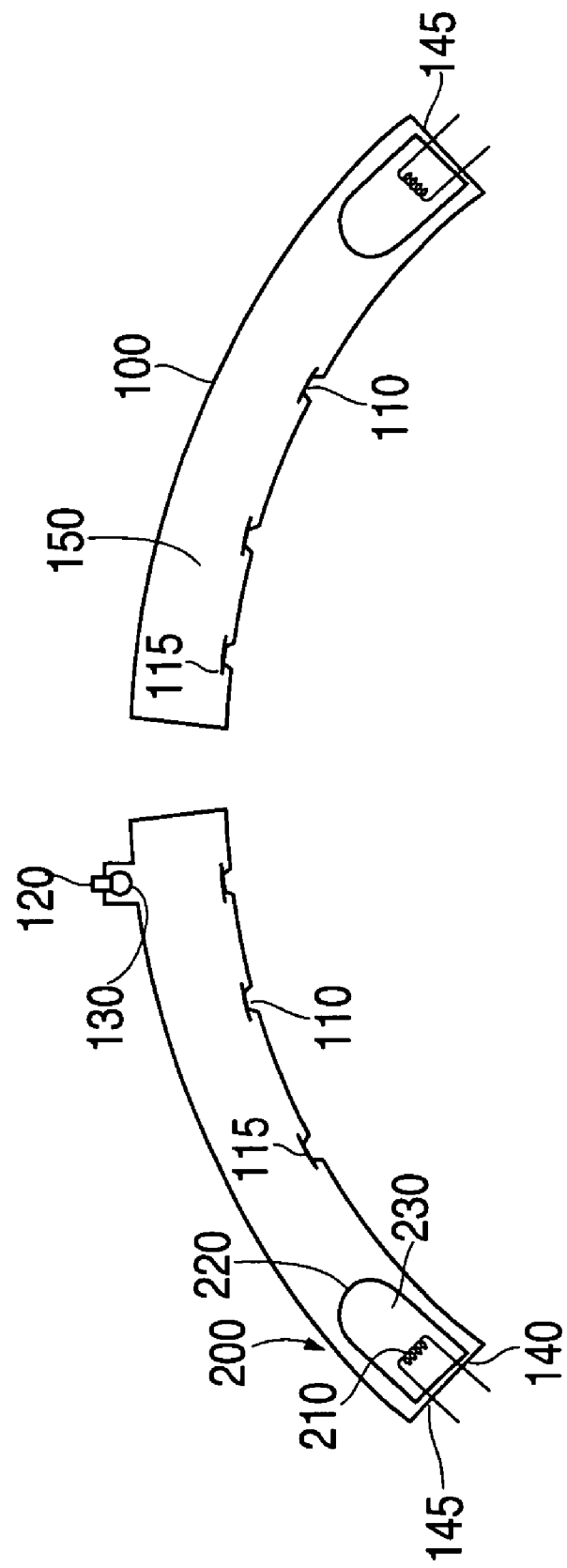
FIG. 1 is a cross-section side view of an inflator according to an exemplary embodiment of the present invention.

According to an embodiment of the present invention an inflator is provided. As shown in FIG. 1, the inflator includes a pipe 100 having a plurality of openings 110. The pipe 100 includes an interior chamber 150 that is filled with an inert gas. The inert gas may include, for example, Argon or Helium. The inert gas may be charged into the pipe 100 through gas inlet opening 120. After the gas is charged into the pipe, the inlet 120 may be sealed, for example, by a ball weld 130. Thus, prior to initiation, the inflator is filled with a prepressurized gas.

The pipe 100 includes two ends 140. Each end 140 of the pipe contains an inflation device 200. The inflation device 200 includes an igniter or initiator 210 and a booster cap 220. The cap 220 covers the igniter 210 and contains a booster propellant 230. Each end 140 of the pipe is sealed by caulking material 145. The igniter 210 includes a portion that extends out of the pipe 100 and is operatively connected to a control circuit that sends a trigger signal to the igniter when a collision involving the related vehicle is determined to be imminent.

Figure 3:
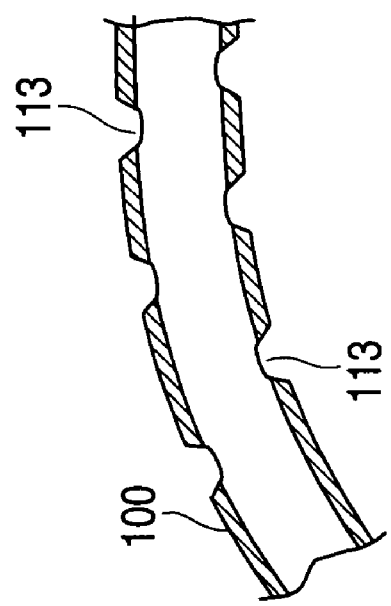
FIG. 3 is a cross-sectional view of a portion of a pipe according to an embodiment of the present invention.

Prior to initiation of the inflator, each of the openings 110 is sealed. According to one exemplary embodiment of the present invention, the openings 110 are closed by a seal 115. The seal 115 is configured to rupture or break when the pressure of the inert gas reaches a predetermined level. The seal 115 may include tape or other similar membranes. Alternatively, as shown in FIG. 3, the opening 10 may be formed as a partial puncture 113 of the wall of the pipe 100. For example, the pipe 100 may be formed of stainless material and a punch may be used to partially penetrate the wall of the pipe 100 to create a weakened portion that ruptures when the pressure of the inert gas located in the pipe reaches a predetermined level.

As mentioned above, the pipe 100 may be formed of stainless steel or other material of sufficient strength to contain the pressurized gas. According to a preferred embodiment of the present invention, the pipe 100 may be bent to conform to the shape of the airbag containing the inflator. However if, for example, the airbag contains a substantially straight upper portion, the pipe 100 may extend along an essentially straight line as shown in FIG. 4.

Figure 2:
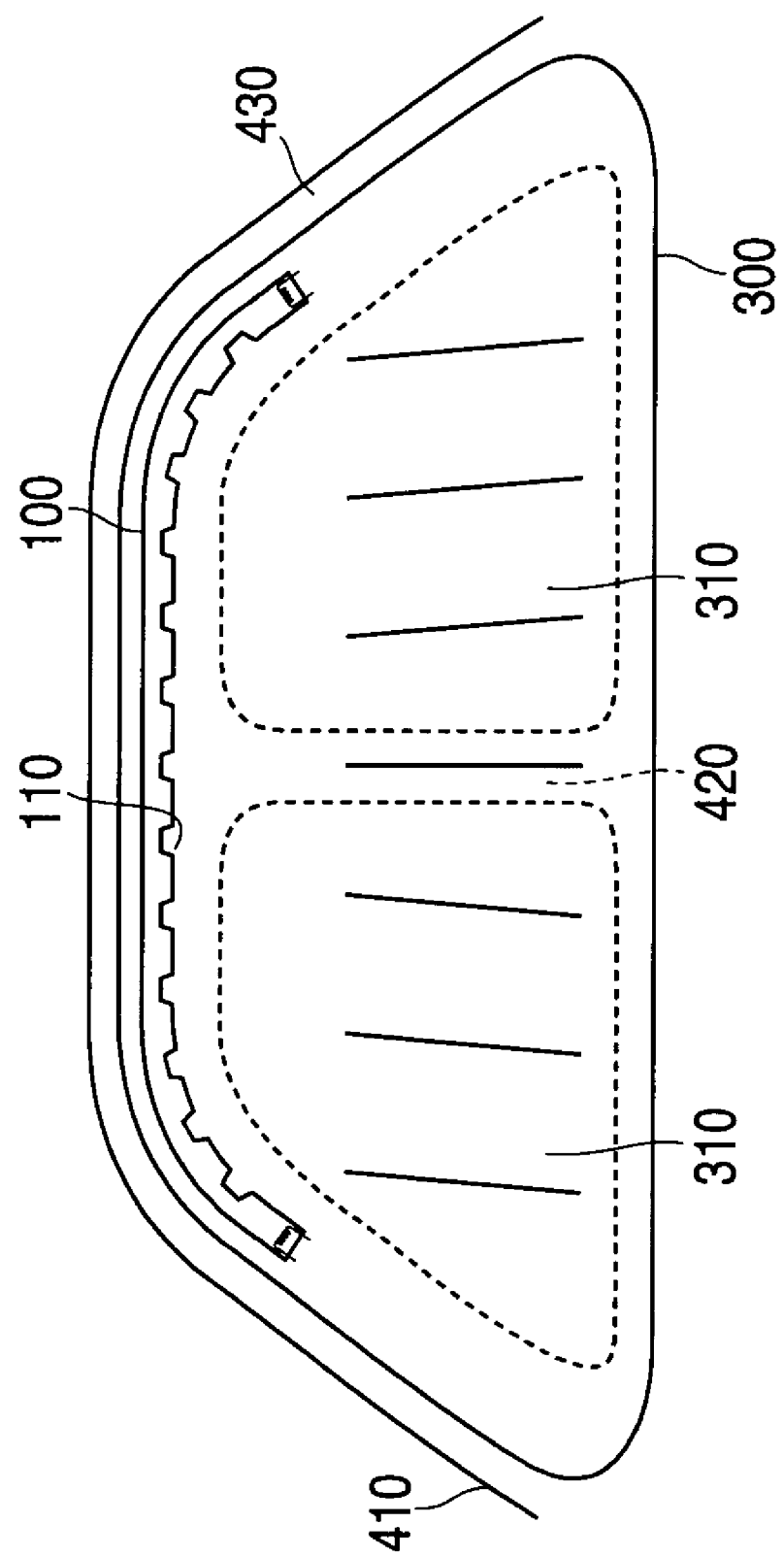
FIG. 2 is a side view of an occupant protecting device according to an embodiment of the present invention.

As shown in FIG. 2, the inflator may be positioned inside an airbag 300 for protecting an occupant of a vehicle. In a preferred embodiment of the present invention, the airbag 300 is configured to inflate along the side of a vehicle. As shown in FIG. 2, the airbag may extend from the A pillar 410 to cover the B pillar 420, and reach the C pillar 430. The airbag 300 may include multiple cells or sections 310. Each of the inflation gas outflow openings 110 may be aligned with the cells 310. Furthermore, as shown in FIG. 2, the shape of the pipe or tube 100 may be curved to conform to the shape of the upper portion of the airbag 300.

In operation, the initiator 210 is triggered by a signal generated by a sensor (e.g., an acceleration type crash sensor) in response to the sensor detecting that a collision involving the vehicle is imminent. After triggering of the initiator 210, the booster propellant 230 ignites creating exhaust gas that ruptures the cap 220 and raises the pressure of the inert gas contained within the pipe 100. The pressure of the inert gas rises thereby causing the outflow openings 110 to become unsealed allowing gas to escape from the inflator into the airbag 300. As the gas exits the pipe 100 and enters the airbag 300, the airbag 300 deploys quickly and evenly along the side of the vehicle cab and covering the pillars 410, 420, 430 of the vehicle.

Figure 4:
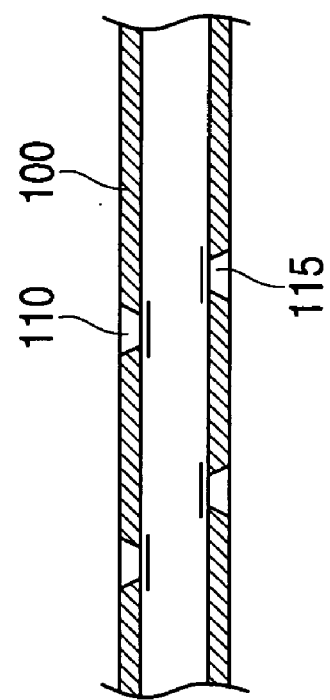
FIG. 4 is a cross-sectional view of a portion of a pipe according to another embodiment of the present invention.

The creation of a flow path through the openings 110 may occur, for example, due to the failure of a weakened portion 113 of the pipe 100 (FIG. 3) or due to the failure of a seal member 115 (FIG. 4). The opening 110 is configured so that the gas pressure required to rupture the seal and create the opening 110 can be predetermined.

As shown in FIGS. 3 and 4, the gas outflow openings 110 may be positioned at various locations along the exterior of the pipe or tube 100. The positioning of the openings 110 in a variety of locations may allow some or all of the airbag 300 to be inflated more quickly. For example, in an embodiment shown in FIG. 6, a length $L_3$ between adjacent openings may be between 10 and 20 mm, preferably about 15 mm.

As is evident from the description above, the provision of an inflator along substantially the entire length of the airbag 300 allows the airbag to be inflated quickly and evenly to thereby provide improved protection to the occupant of the vehicle.

The present invention also includes an embodiment of an inflator containing a gas generant or propellant as an alternative to the stored gas. According to yet another embodiment the inflator may contain a decomposing type material as the source of the pressurized gas for the airbag.

Figure 5:
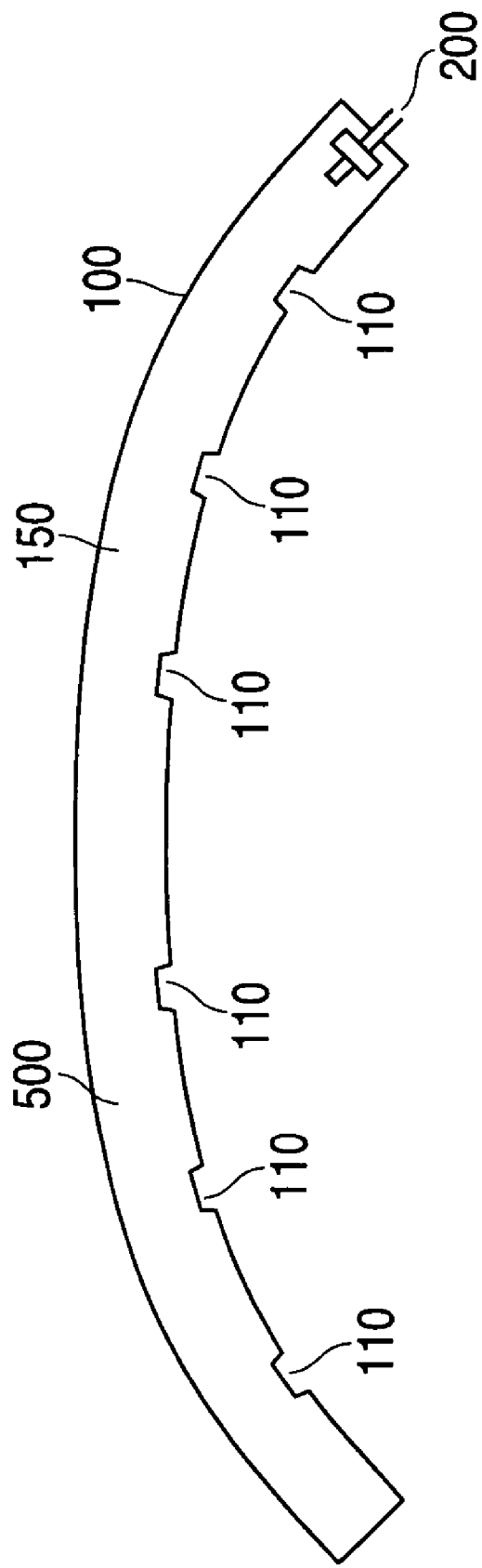
FIG. 5 is a cross-sectional side view of a pipe according to an exemplary embodiment of the present invention.

As shown in FIG. 5, according to another embodiment of the present invention the pipe or tube 100 may contain a gas generant or propellant 500. The inflator may also contain a standard igniter 200 or initiator assembly disposed at one end of the tube 100. The igniter 200 receives a signal from a firing circuit or controller in order to initiate operation of the inflator.

The propellant charge or gas generant 500 may extend for all, most, or same of the length of the pipe 100 thereby facilitating a substantially uniform gas generation once the propellant 500 is ignited. Uniform gas generation across the length of the inflator is desirable so that an airbag 300 is uniformly inflated. The plurality of gas outlets 110 fluidly communicate with the airbag once the propellant 500 is ignited and thereby provide sustained and uniform inflation over the length of the airbag. The propellant material may be selected from conventional known propellants such as disclosed in U.S. Patent Application Publication 2001/0045735 A1.

For the aforementioned airbag embodiments, the present invention includes certain preferred parameters. These parameters are selected to ensure proper rapid, uniform and, if necessary, sustained inflation of the airbag.

Figure 6:
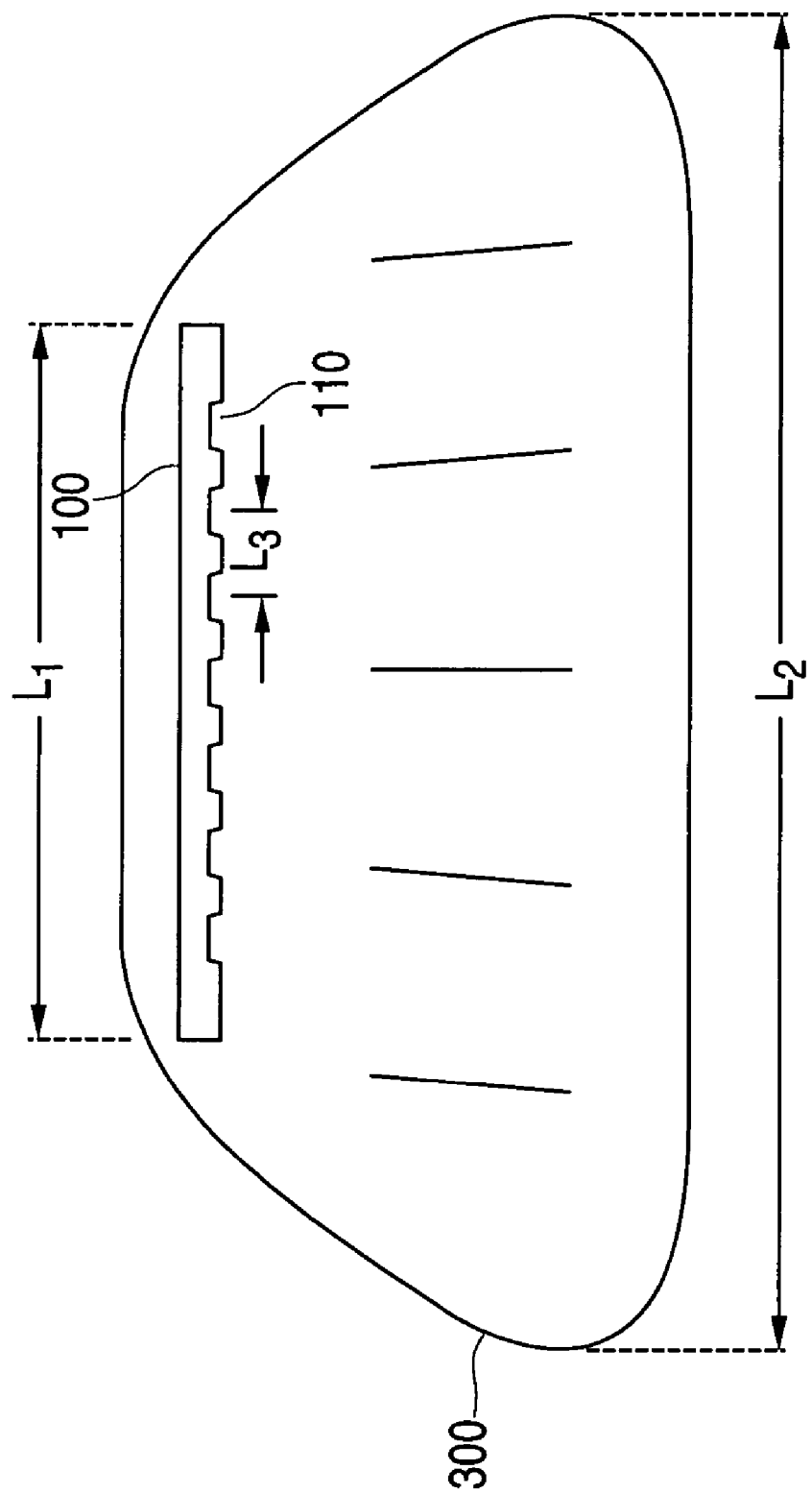
FIG. 6 is a side view of an inflator and airbag according to an embodiment of the present invention.

For example, referring now to FIG. 6, the length ($L_1$) of the inflation tube 100 may be carefully selected based on the length ($L_2$) of the side curtain type airbag 300. As described above the tube 100 may be curved or linear. The length ($L_1$) corresponds to the length of the tube 100 as measured longitudinally along the geometric center of the tube 100. As shown in FIG. 6, the length ($L_2$) of the airbag 300 is measured along the bottom edge of the deployed side curtain 300. According to an embodiment of the present invention the ratio of length of the inflation tube to the length of the airbag ($L_1/L_2$) is between about 0.7 and about 1.0. According to another embodiment of the present invention, the ratio ($L_1/L_2$) is between about 0.75 and about 0.95. According to still another embodiment of the present invention, the ratio ($L_1/L_2$) is between about 0.80 and about 0.90. According to another embodiment of the present invention, the ratio ($L_1/L_2$) is about 0.85. In one embodiment, the length $L_1$ of the tube 100 is between about 1.0 and 3.0 m, and is preferably between about 1.2 and 1.4 m, preferably about 1.3 m, or preferably between about 2.4 and 2.6 m, preferably about 2.5 m.

Further by way of example, the number of openings or holes 110 can be determined based on the length ($L_1$) of the inflation tube 100. According to a preferred embodiment, the openings 110 are positioned so that there are about 10 openings per meter along the length of the inflation tube 110. According to another embodiment of the present invention, the number of openings is between 20 and 100 per meter of tube length, preferably between 50 and 80 per meter, and preferably about 70 per meter. The holes 110 are also preferably sized so that the area of the opening 110 is about 40 $mm^2$, such as a circle having a diameter of 7 mm, but could range from 10 $mm^2$ to 100 $mm^2$. However, as explained below the size of the opening may vary based on other parameters of the inflator.

Another important parameter for improving airbag performance and reliability is the size of the openings 110 with regard to the size of the tube 100 (i.e., the length and cross-sectional area). For example, the size of each of the openings 110 is selected to have a cross-sectional area $A_1$ that is of predetermined size with regard to the cross-sectional area $A_2$ of the inflation tube or pipe 100. The cross-sectional area $A_1$ of the opening 110 corresponds to the surface area of the portion of the tube 100 that is not present in order to accommodate the opening 110, as shown in FIG. 7. The cross-sectional area $A_2$ of the tube 100 is determined based on a lateral cross-section substantially perpendicular to the longitudinal direction of the tube, also shown in FIG. 7. According to an embodiment of the present invention, the ratio of the cross-sectional area $A_2$ of the tube 100 over the cross-sectional area $A_1$ of the opening 110 is between about 20.0 and about 2.0. According to another embodiment the ratio ($A_2/A_1$) is between about 16.0 and about 10.0. According to yet another embodiment the ratio ($A_2/A_1$) is about 13.0.

According to another embodiment of the present invention, the inflator tube 100 and the openings 110 are selected so that ratio of the size $A_1$ of the opening 110 to the length $L_1$ of the tube 100 is predetermined. For example, the ratio cross-sectional area to the length of the tube ($A_1/L_1$) is between about 0.01 (mm²/mm) and 0.04 (mm²/mm). According to another embodiment the ratio ($A_1/L_1$) is between about 0.02 (mm²/mm) and about 0.03 (mm²/mm). According to yet another embodiment the ratio ($A_1/L_1$) is about 0.025 (mm²/mm).

Referring now to FIGS. 9a to 9c, the present invention also includes a cascade inflator for an airbag that covers a vehicle length by approximately 60% to 100%. FIG. 9a shows an inflator having a tube length X, the inflator connected to an automobile either inside or outside the automobile (both embodiments shown), the automobile having a length Y. In a preferred embodiment, a ratio of the length X of the inflator to the length Y of the car is between about 60% and about 100%, preferably between about 70% and 90%, and more preferably about 80%. In FIG. 9a, the inflator is configured and located to inflate the airbag along a side of the automobile. FIG. 9b shows another embodiment of a cascade inflator for an airbag configured to inflate the airbag along a front of the automobile, and FIG. 9c shows another embodiment of a cascade inflator for an airbag configured to inflate the airbag along a back of the automobile.

WO 00/32447 discloses an inflator for use with a variety of airbags and seat belts. U.S. Patent Application Publication 2001/0045735 A1 discloses an elongated inflator. Both of the foregoing documents are incorporated by reference herein in their entireties. The scope of the present invention includes providing the inflators disclosed in the foregoing documents in combination with the additional improvements and benefits described above.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A protecting device for an occupant of a vehicle, comprising:
    an airbag positioned to inflate along an interior side of a vehicle;
    an elongated inflator including a pre-pressurized tube extending along the interior side of the vehicle in a longitudinal direction of the vehicle; and
    a plurality of openings in the tube positioned to allow inflation gas to enter and inflate the airbag,
    wherein the tube includes about 20 to about 100 openings per meter of tube length.

2. The protecting device as claimed in claim 1, wherein the inflator is between about 1.0 and about 3.0 meters in length.

3. The protecting device as claimed in claim 1, wherein at least one of said openings has an area of between about 10 and about 100 mm².

4. A protecting device for an occupant of a vehicle, comprising:
    an airbag positioned to inflate along an interior side of a vehicle;
    an elongated inflator including a pre-pressurized tube extending along the interior side of the vehicle in a longitudinal direction of the vehicle; and
    a plurality of openings in the tube positioned to allow inflation gas to enter and inflate the airbag, wherein the openings are sealed with membranes, and
    wherein the tube includes about 20 to about 100 openings per meter of tube length.

5. A protecting device for an occupant of a vehicle, comprising:
    an airbag positioned to inflate along an interior side of a vehicle;
    an elongated inflator including a tube extending along the interior side of the vehicle in a longitudinal direction of the vehicle; and
    a plurality of openings in the tube positioned to allow inflation gas to enter and inflate the airbag, wherein the openings comprise partial punctures having weakened portions configured to rupture when a pressure inside the tube exceeds a predetermined threshold; and
    wherein the tube includes about 20 to about 100 openings per meter of tube length.

6. The protecting device as claimed in claim 1, wherein the tube is filled with an inert gas and sealed prior to initiation of the inflator.

7. The protecting device as claimed in claim 1, wherein the tube is filled with propellant and sealed prior to initiation of the inflator.

8. The protecting device as claimed in claim 1, wherein the inflator includes first and second inflation devices connected to first and second ends of the tube, respectively.

9. The protecting device as claimed in claim 1, wherein a ratio of a length of the tube to a length of the airbag is between about 0.7 and about 1.0.

10. The protecting device as claimed in claim 1, wherein a ratio of a cross sectional area of the tube to an area of one of the openings is between about 2 and about 20.

11. The protecting device as claimed in claim 1, wherein a ratio of an area of one of the opening to a length of the tube is between about 0.01 (mm²/mm) and about 0.04 (mm²/mm).

12. The protecting device as claimed in claim 1, wherein a ratio of a length of said inflator to a length of said vehicle in said one of a longitudinal and a lateral direction is between about 0.6 and 1.0.

13. The protecting device as claimed in claim 4, wherein a ratio of a length of the tube to a length of the airbag is between about 0.7 and about 1.0.

14. The protecting device as claimed in claim 4, wherein a ratio of a cross sectional area of the tube to an area of one of the openings is between about 2 and about 20.

15. The protecting device as claimed in claim 4, wherein a ratio of an area of one of the opening to a length of the tube is between about 0.01 (mm$^2$/mm) and about 0.04 (mm$^2$/mm).

16. The protecting device as claimed in claim 4, wherein a ratio of a length of said inflator to a length of said vehicle in said one of a longitudinal and a lateral direction is between about 0.6 and 1.0.

* * * * *